United States Patent [19]

Elliott

[11] 4,198,706
[45] Apr. 15, 1980

[54] GENERATION OF LOW FREQUENCY SOUND UNDER WATER

[75] Inventor: Myron A. Elliott, Lynn Haven, Fla.

[73] Assignee: The United States of America as represented by the Secretary of the Navy, Washington, D.C.

[21] Appl. No.: 835,375

[22] Filed: Aug. 21, 1959

[51] Int. Cl.² .................. H04B 13/00; G10K 7/00
[52] U.S. Cl. .................................. 367/148; 116/147
[58] Field of Search ............. 116/26, 27, 147, 142 FP; 114/235, 221, 240; 89/1 A, 7; 102/18; 340/405, 8 PC; 181/0.51

[56] References Cited

U.S. PATENT DOCUMENTS

| 1,143,703 | 6/1915 | Hecht | 116/147 |
| 1,209,503 | 12/1916 | Schenkelberger | 116/147 |
| 2,500,008 | 3/1950 | Richardson | 116/147 |
| 2,616,956 | 11/1952 | Russell | 116/147 |
| 2,732,547 | 1/1956 | Fletcher | 116/147 |

FOREIGN PATENT DOCUMENTS 623175  11/1935  Fed. Rep. of Germany ........... 340/405

Primary Examiner—Harold J. Tudor
Attorney, Agent, or Firm—Louis A. Miller; Rolla N. Carter

EXEMPLARY CLAIM

1. Apparatus for the generation of sound under water including a siren comprising a cylindrical stator casing open at each end and having at least one radial port and a cylindrical rotor member open at each end and mounted concentrically with respect to said stator casing, said rotor member having at least one radial opening circumferentially alined with said stator port, and a gas-filled compliance chamber having an elastic rubber-like wall closing one open end of said stator casing and operative to store and release hydraulic energy.

5 Claims, 5 Drawing Figures

GENERATION OF LOW FREQUENCY SOUND UNDER WATER

The invention described herein may be manufactured and used by or for the Government of the United States of America for governmental purposes without the payment of any royalties thereon or therefor.

The present invention relates to underwater acoustics and more particularly to the generation under water of high intensity low frequency sound and the harmonics thereof. In the preferred embodiment the invention is exemplified by a siren type noisemaker positively driven by a submersible electric pump.

The invention contemplates the provision of a high intensity cavitation type low frequency underwater sound source of relatively high mechanical efficiency useful in sweeping ground mines sensitive to acoustic influence.

A ship sailing through a seaway introduces into the water a multiplicity of sounds which more or less includes all the spectrum form below five cycles to above forty kilocycles per second. The variation in intensity of the sound received by a fixed point on the seabed as a ship approaches, passes over and recedes from said fixed point is referred to as the ship's acoustic signature.

Acoustic influence mines can be designed to be responsive to the acoustic signature of ships differing in size and speeds and can be made highly selective so as to discriminate against underwater sounds which do not correspond to the "pattern" required to actuate the mine mechanism. Since there is no way to known in advance the particular pattern or signature to which an enemy mine may be receptive, a mine field can be rendered safe for the passage of a given type ship by sweeping with an acoustic device which substantially duplicates the acoustic signature of the type of ship to be protected. Such an acoustic sweep therefore requires high intensity sounds throughout the spectral range of a ship's noise and it has been found quite difficult to produce a single sound source having the desired acoustic output. Mechanical low frequency noisemakers have had considerable use and are efficient within their limitations; however, they become excessively large and expensive if they are made capable of producing the intensities and frequencies required for the satisfactory sweeping of low frequency acoustic mines. Cavitation type sound sources have been developed in which a mixture of water and air is periodically accelerated through a rapidly opening and closing port to produce cavities, the collapse of which produces a useful range of frequencies. Both these types of noisemakers have air within their moving parts and hence are quite vulnerable to the explosion of nearby mines so that if they are just marginally successful they become expendable.

In accordance with the present invention in its preferred form, an external stator and an internal rotor are provided as in a siren with a pair of matching ports which coincide twice each revolution of the rotor, the stator ports preferably being elongated in the axial direction and provided with port extensions. Water under high pressure provided by a standard submersible electric pump constitutes a source of energy to accelerate water slugs periodically through the stator ports and perpendicular to the periphery of the stator so that cavities form behind the water slugs when the stator ports are suddenly closed and the collapse of these cavities takes place outside the stator. An air filled compartment having a rubber diaphragm separating it from the water within the rotor provides an internal compliance chamber axially opposite the water intake to serve the very important function of storing water and hydraulic power during the time the stator ports are closed so that slugs of water will be ejected at high velocity through the stator ports during the short time they are simultaneously open. In addition to storing energy and increasing the output at low frequencies, the compliance chamber serves to reduce shock losses and allows the pump to work continuously. Also in accordance with the invention an additional rotor is utilized to vary the effective area of the ports in the stator for modulating the water output and therefore the acoustic output is amplitude modulated.

The primary object of the present invention is to provide a cavitation type underwater sound source of high intensity.

Another object of the invention is the provision of an underwater sound source of the cavitation type which is highly shock resistant.

Still another object of the invention is the provision of a high intensity sound source which may be either frequency modulated or amplitude modulated or both.

Other objects and advantages of the invention will become apparent from the following description when read in connection with the accompanying drawings in which.

Figure 1:
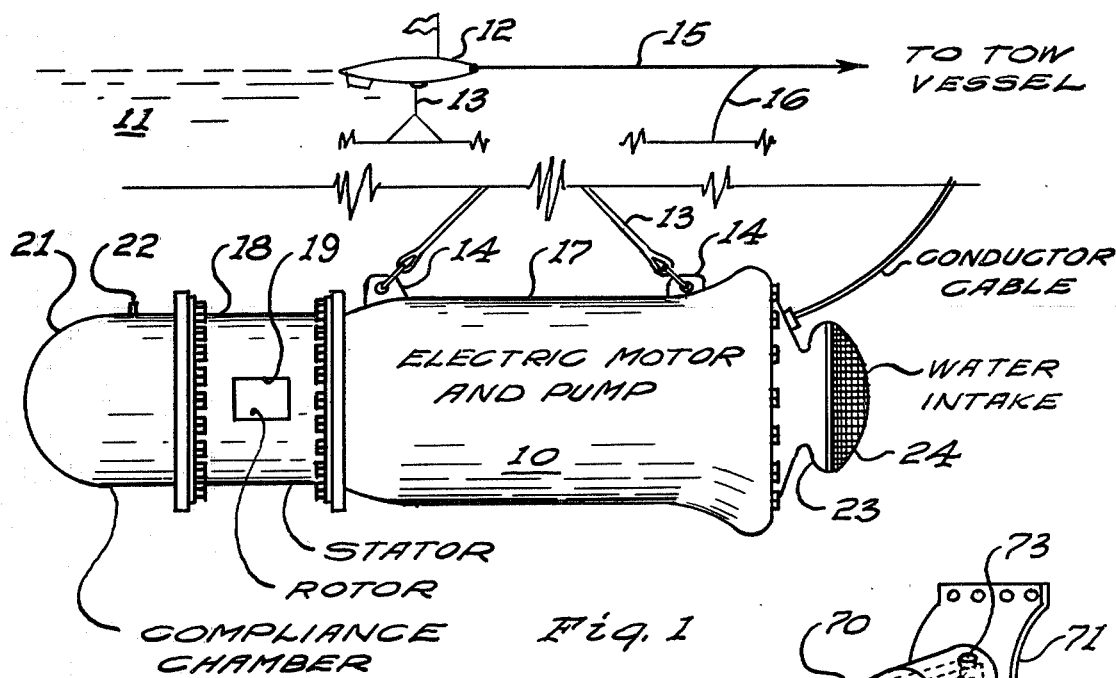
FIG. 1 is a schematic representation of an apparatus of the invention streamed for tow in a body of water.

In FIG. 1 a noisemaker 10 is shown supported at a suitable depth, say 25 to 30 feet, in a body of water 11 by a float 12 through cables 13 secured to the float 12 and to lifting pods 14 provided on the noisemaker 10. The float 12 is shown in position to be towed through the body of water 11 by a tow cable 15 streamed from a towing vessel not shown. A conductor cable 16 streamed from the towing vessel and preferably married to the tow cable 15 extends through the forward wall of a motor and pump casing 17 for providing electric power to the motor. The electric motor and pump within the casing 17 may be a commercially available submersible electric pump and need not be further described, its sole function being to pump water and to furnish the drive for a main shaft as hereinafter described. Immediately aft of the motor and pump assembly 17 is a stator casing 18 provided with two horizontal oppositely facing ports 19. The aft portion of the assembly 10 comprises a compliance chamber 21 adapted to be filled with air under pressure through a suitable valve 22. The motor driven pump in the casing 17 draws water through an intake 23 optionally covered with a screen 24 and discharges it through the stator ports 19 as will be described in detail in connection with FIG. 2.

Figure 2:
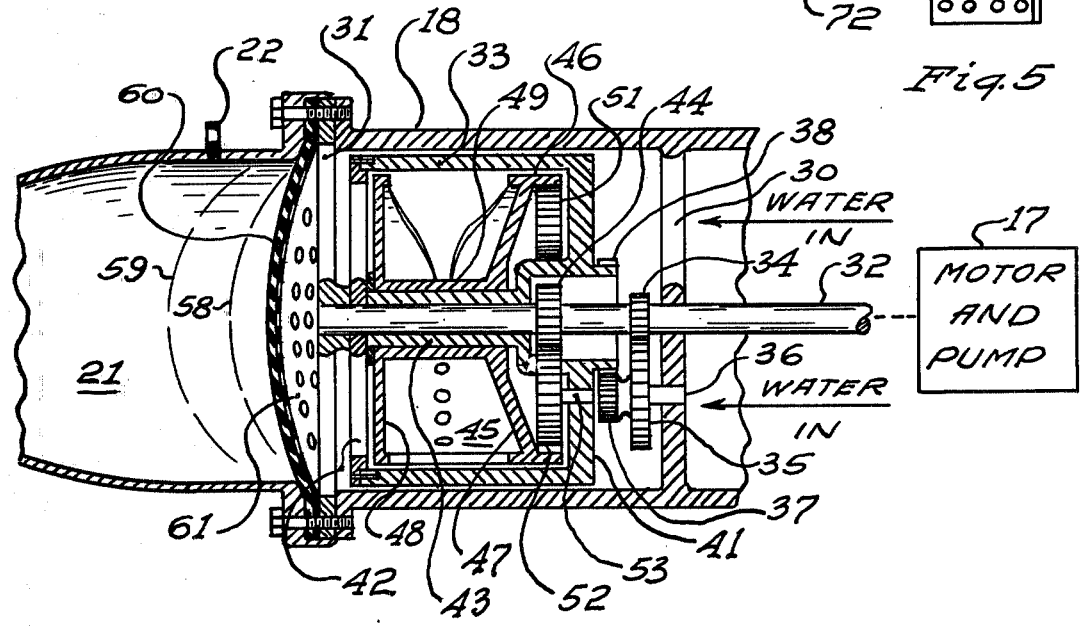
FIG. 2 is a sectional view of a sound generator embodying the preferred form of the invention.

As shown in FIG. 2, the stator 18 is provided at its forward and aft ends with bearing supporting spiders 30 and 31, respectively, in which is journaled a main shaft 32 connected to be driven directly by the shaft of the motor and pump 17. A main internal rotor 33 having an outside diameter slightly less than the inside diameter of the stator casing 18 is rotatively mounted on the main shaft 32 between the spiders 30 and 31 and is adapted to be rotated by a drive pinion 34 keyed to the main shaft 32 through a gear train comprising a spur gear 35 rotatively mounted on a stationary shaft 36 supported in an arm of the spider 30, a secondary pinion 37 integral with the spur gear 35 and a secondary spur gear 38 coaxial with and carried by the main rotor 33. The main rotor 33 has two sets of spokes 41 and 42, respectively, radiating from opposite ends of a cylindrical hub 43 the forward end of which is enlarged to provide clearance for a sun gear 44 keyed to the main shaft 32. A modulator 45 having a peripheral drum 46 supported by two axially spaced sets of spokes 47 and 48 radiating from the forward and aft ends, respectively, of a cylindrical sleeve hub 49 surrounding the main rotor hub 43 in bearing relation. The forward end of the drum 46 overhangs the spokes 47 and is provided with an internal ring gear 51 which is geared to the sun gear 44 through a planetary pinion 52 rotatively mounted on a planetary shaft 53 mounted in a spoke 41 of the main rotor 33.

Figure 3:
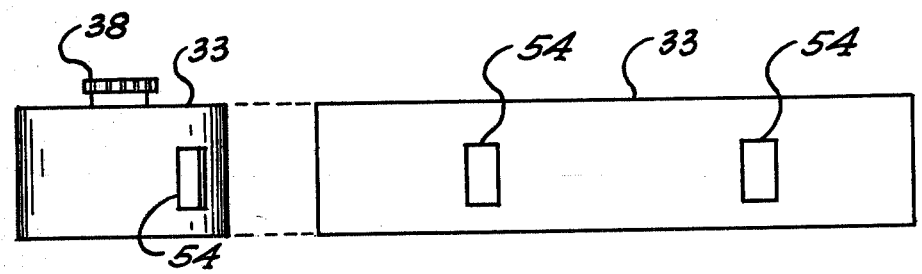
FIG. 3 is a view showing the development of the main rotor drum.
Figure 4:
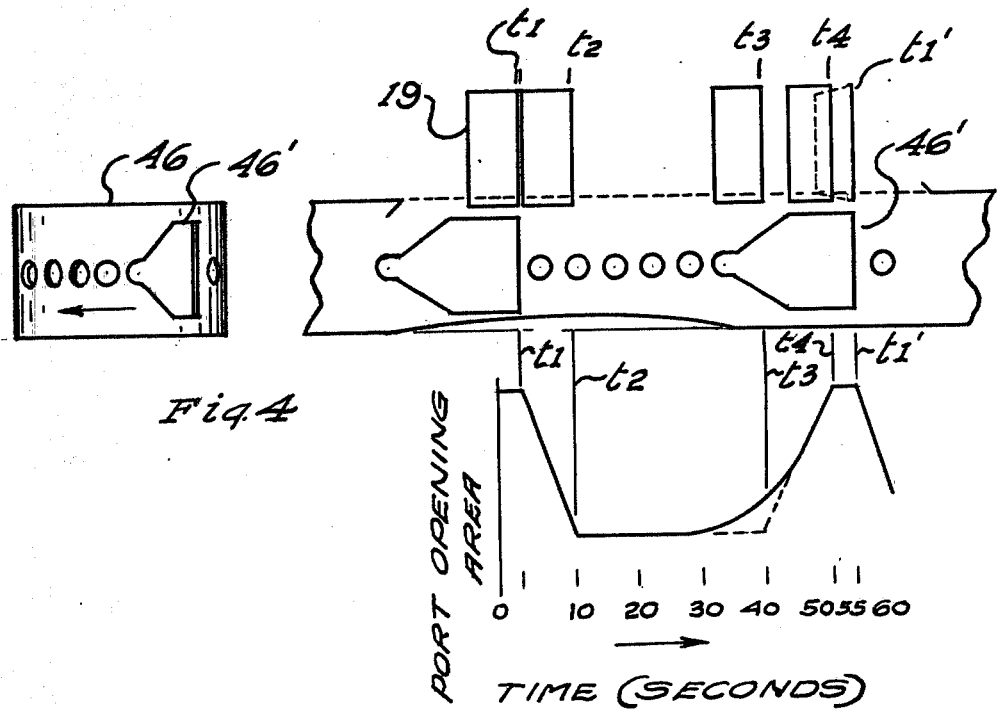
FIG. 4 is a fragmentary view showing the development of the modulating rotor drum of FIG. 1 and its relation to the stator ports with respect to time.

As can be seen in FIGS. 3 and 4, the main rotor 33 is provided with two opposed ports 54 which upon rotation of the rotor 33 periodically coincide with and preferably equal in area the horizontally disposed ports 19 in the stator 18 and the modulator rotor 45 has its drum 46 provided with two identical sets of openings which upon rotation in the direction indicated simultaneously varies the effective areas of the stator ports 19, the arrangement being such that from a preselected low level the sound gradually increases in amplitude to a maximum in simulation of a ship passing and thereafter falls off rather abruptly. From the above description, it will be evident that water from the motor driven pump 17 enters the stator casing 18 in the direction indicated by the arrows labeled WATER IN, passes axially through the spider 30, between the spokes 41 and 47 and is periodically discharged radially through the openings in the modulator rotor 45, the main rotor 33 and the stator ports 19. A functionally equivalent arrangement would be a stator having an external rotor and an internal modulator drum and such would preferably be employed if the rotor was to be water driven in a well known manner. However, a mechanical driving arrangement is more simple to provide for an internal rotor.

In accordance with the invention, energy is conserved and shock is reduced by providing the compliance chamber 21 for accumulating water pumped during the intervals the stator ports 19 are closed and returning this water to the stream when the ports are open. An elastic diaphragm 60 preferably of neoprene is mounted between the stator section 18 and the compliance chamber 21 to separate the air in the compliance chamber 21 from the water. A perforated guard plate 61 is mounted on the water side of the diaphragm 60 to limit the excursion of the diaphragm 60 when the pressure in the compliance chamber 21 exceeds the pressure in the stator section 18 such as is the case when the compliance chamber 21 is initially pressurized.

In one operating embodiment of the invention having a stator with an inside diameter of 12 inches, a three conductor power tow cable 16 delivered three phase sixty cycle power to the electric motor and pump assembly 17 to pump 900 gallons of water a minute and to rotate the shaft 32 at 1,800 r.p.m., the gear chain comprised of the gears 34, 35, 37 and 38 drove the main rotor 33 at 450 r.p.m. to provide a fundamental frequency of fiteen cycles per second and the planetary gear system comprised of the sun gear 44, the planetary pinion 52 and the ring gear 51 rotated the modulator rotor 45 at approximately $\frac{1}{4}$ r.p.m., viz., one full cycle in 55 seconds, to provide an amplitude modulation cycle of approximately one minute. With the stator ports 19 and the rotor ports 54 substantially ten square inches in area, the average operating pressure was about 120 p.s.i. with a maximum pressure of about 160 p.s.i. during minimum port area provided by the modulator rotor 45. The compliance chamber 21 is initially pressurized about 15 p.s.i. under the average operating pressure so that the diaphragm 60 is free to oscillate as indicated by dash lines 58 and 59 without contacting the guard screen 61 during normal operation. The above operating parameters indicate that on the average each time the stator ports 19 are opened by the main rotor 33, a $\frac{1}{2}$ gallon slug of water is ejected through each port, i.e. a total of one gallon each cycle.

FIG. 4 shows in graphic form the effective area of the stator port openings 19 and the variation in area with respect to time as determined by the rotation of the modulator rotor drum 46 as above described. With zero time arbitrarily chosen at the mid point of the transit of the rectangular portion of the large openings 46' in the drum 46 past the stator ports 19, it is noted that at time $t_1$ the port 19 commences to be closed and at time $t_2$ the minimum area of the port 19 is open which area remains constant until the tapered portion of the large opening 46' commences to enlarge the uncovered area of the port 19 at time $t_3$, after which the uncovered area of the port 19 gradually increases until at time $t_4$ the port 19 is fully uncovered and remains so until the start of another cycle at $t_1'$. The minimum area represented by the circular apertures in the drum 46 is chosen to provide the desired amplitude of modulations of say 15 db.

In the operation of the apparatus the motor driven pump assembly 17 forces water under pressure axially into the rotor stator assembly and against the diaphragm 60 to further compress the air in the compliance chamber 21. As the ports of the stator 18 and the main rotor 33 periodically aline, slugs of water are intermittently forced out through the modulating rotor drum 46 and these ports at a high velocity and as the main rotor 33 continues to rotate to move the ports out of alinement and thereby rather abruptly cutting off the water flow, large cavities are drawn out behind the slugs of water the collapse of which cavities generates underwater sound in a broad spectral band. During the time the ports 19 are closed, the flow of water is accumulated by further expansion of the diaphragm 60 so that the water flow from the pump assembly remains relatively constant. The movement of the diaphragm 60 under this pressure of water still further compresses the air in the compliance chamber 21 thereby storing energy which is released to help force out subsequent slugs of water as the ports are again alined.

Figure 5:
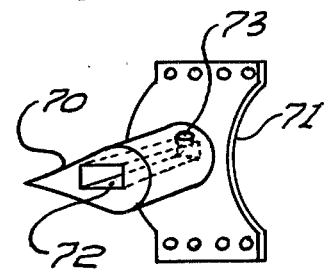
FIG. 5 is a view in perspective of a stator port extension means.

It has been found that increased sound output especially at the lower harmonics is obtainable by providing the stator ports 19 with port extensions, one suitable arrangement being shown in FIG. 5 as comprising a faired body 70 secured to a curved plate 71 and provided with an axially extending horn-shape channel 72. A channel which increases in cross sectional area from the size and shape of the stator port 19 to about twice this dimension, i.e., four times the area, has been found satisfactory for a port extension one foot in length. The port extension assembly shown in FIG. 5 together with a mirror image thereof are adapted to be clamped in alinement with the stator ports 19 any well known manner. The increase in the sound pressure level provided by these port extensions is believed to be caused by the formation of larger cavities due to the shielding effects of the port extension walls. It is preferred to provide laterally extending openings 73 near the base of the port extension 70 to permit the entry of some water into the base of the channel 72 prior to the collapse of a cavity formed therein so as to protect the face of the main rotor 33 from cavitation erosion. The port extension 70 can of course be made integral with the stator casing 18 but inasmuch as it is subjected most to cavitation erosion it is preferably detachable for easy replacement.

While for the purpose of disclosing the invention, a preferred embodiment thereof has been described in detail, it will be obvious to those skilled in the art that many modifications may be made utilizing the same general mode of operation. Also, while a fundamental frequency of 15 cycles per second has been assured for disclosing the invention, it will be evident that higher as well as much lower frequencies can readily be obtained in designing the apparatus. In this connection, it is pointed out as a general rule that to obtain corresponding sound level outputs, the lower the fundamental frequency the greater the volume of water has to be pumped which of course increases overall size and power requirements. Although omitted from the drawing in the interest of clarity, it is preferred as is customary to employ three spur gears 35 and secondary pinions 37 arranged symmetrically about the drive pinion 34 and the secondary spur gear 38 with which they mesh, respectively. Also, three planetary pinions 52 are symmetrically disposed about the sun gear 44. Obviously if a motor designed to run at the proper speed, 450 r.p.m. in the above example, is employed the rotor 33 may be directly coupled thereby eliminating one gear train.

The apparatus above described produces the fundamental and all harmonics up to at least forty kilocycles with a fairly constant high sound pressure level in all harmonics up to one kilocycle which latter range is generally the most useful spectral range for minesweeping and one which has been difficult to cover with a single apparatus. The modulation cycle and the amplitude of the modulation indicated above were so chosen as to simulate the passage of a ship at a speed of from eight to ten knots. Frequency modulation and its accompanying amplitude modulation can be obtained as heretofore by varying the frequency of the a.c. power supplied to the cable 16.

The apparatus of the invention provides an efficient sound source for producing underwater sound at the level and in the frequency range found useful for the sweeping of acoustic mines. The apparatus of the invention is very shock resistant by reason of the fact that all moving parts are free flooded with an absence of air pockets and the compliance chamber which alone contains air can readily be built up to almost any desired strength.

What is claimed is:

1. Apparatus for the generation of sound under water including a siren comprising a cylindrical stator casing open at each end and having at least one radial port and a cylindrical rotor member open at each end and mounted concentrically with respect to said stator casing, said rotor member having at least one radial opening circumferentially alined with said stator port, and a gas-filled compliance chamber having an elastic rubberlike wall closing one open end of said stator casing and operative to store and release hydraulic energy.

2. Apparatus in accordance with claim 1 wherein said stator casing is provided with two diametrically opposed radial ports and said rotor member is provided with two radial openings which match said eradial ports.

3. Apparatus in accordance with claim 1 including a foraminous guard means between said elastic wall and said one open end of said stator casing for limiting the excursion of said elastic wall in the direction of increasing volume of said compliance chamber.

4. Underwater sound generating apparatus of the siren type comprising a drum type rotor, a cylindrical stator member surrounding said rotor, said rotor and said stator member having circumferentially spaced ports adapted to aline periodically upon rotation of the rotor, and an auxiliary rotor of the drum type concentric with said stator member and having openings distributed throughout its circumference so that at all angular positions of said auxiliary rotor at least one of said distributed openings is aligned with each of said stator ports, said auxiliary rotor being positioned within said drum type rotor and said distributed openings being of different area whereby rotation of said auxiliary rotor varies the effective area of said stator ports in a predetermined manner.

5. Underwater sound generating apparatus of the kind described wherein water is pumped axially into an underwater siren of the drum type and is discharged radially in successive slugs through ports in an external stator when said ports are temporarily opened and abruptly closed intermittently by an internal rotor member, the acceleration of each slug of water being sufficient to draw out a cavity when its associated port is abruptly closed, characterized by said stator ports having walls defining horn-shape channels to constrain cavity formation and collapse to substantially a single direction, said channels increasing gradually in cross-sectional area with length and having a volume substantially equal to the volume of the cavity formed, and the walls of said stator ports having at least one lateral passageway between the base of the port and the open water for the entry of water to lessen cavitation erosion of the surface of said rotor member.

* * * * *